(12) United States Patent
Kim et al.

(10) Patent No.: US 11,558,811 B2
(45) Date of Patent: Jan. 17, 2023

(54) METHOD AND APPARATUS FOR SELECTING CORE NETWORK SUITABLE FOR SERVICE IN NEXT GENERATION MOBILE COMMUNICATION SYSTEM

(71) Applicant: Samsung Electronics Co., Ltd., Suwon-si (KR)

(72) Inventors: Donggun Kim, Seoul (KR); Alexander Sayenko, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 16/650,173

(22) PCT Filed: Sep. 27, 2018

(86) PCT No.: PCT/KR2018/011391
§ 371 (c)(1),
(2) Date: Mar. 24, 2020

(87) PCT Pub. No.: WO2019/066473
PCT Pub. Date: Apr. 4, 2019

(65) Prior Publication Data
US 2021/0204206 A1 Jul. 1, 2021

(30) Foreign Application Priority Data
Sep. 27, 2017 (KR) .......................... 10-2017-0125067

(51) Int. Cl.
*H04W 48/18* (2009.01)
*H04W 84/04* (2009.01)

(52) U.S. Cl.
CPC .......... *H04W 48/18* (2013.01); *H04W 84/042* (2013.01)

(58) Field of Classification Search
None
See application file for complete search history.

(56) References Cited

U.S. PATENT DOCUMENTS

2005/0215253 A1  9/2005  Johannesson et al.
2016/0353361 A1  12/2016  Jung et al.
(Continued)

FOREIGN PATENT DOCUMENTS

KR  10-2006-0129093 A  12/2006
KR     10-1250637 B1   4/2013
(Continued)

OTHER PUBLICATIONS

TS_36.331 _E-UTRA_RRC_Protocol_spec._Rel.13_3-21-2017. pdf (Year: 2017).*

(Continued)

*Primary Examiner* — Jinsong Hu
*Assistant Examiner* — Alexander J Yi
(74) *Attorney, Agent, or Firm* — Jefferson IP Law, LLP

(57) ABSTRACT

The present invention relates to a communication technique for combining IoT technology with 5G communication systems for supporting higher data transmission rates than 4G systems, and to a system therefor. The present disclosure can be applied, on the basis of 5G communication technology and IoT-related technology, to intelligent services such as smart homes, smart buildings, smart cities, smart cars or connected cars, health care, digital education, retail business, security- and safety-related services. The present invention relates to a method for configuring temporal ordering of uplinks in a wireless communication system, more specifically, in 3GPP 5G New Radio (NR).

12 Claims, 12 Drawing Sheets

(56) References Cited

U.S. PATENT DOCUMENTS

| | | |
|---|---|---|
| 2017/0142648 A1 | 5/2017 | Jiang et al. |
| 2017/0245316 A1* | 8/2017 | Salkintzis ............. H04W 48/16 |
| 2018/0213466 A1* | 7/2018 | Kotecha ................. H04L 67/22 |
| 2018/0262980 A1 | 9/2018 | Jeong et al. |
| 2019/0173533 A1 | 6/2019 | Kim et al. |

FOREIGN PATENT DOCUMENTS

| | | |
|---|---|---|
| KR | 10-2016-0138510 A | 12/2016 |
| KR | 10-2017-0058762 A | 5/2017 |
| KR | 10-2018-0016301 A | 2/2018 |
| WO | 2015-119472 A1 | 8/2015 |

OTHER PUBLICATIONS

Centonza—WO 2017-135859A1 (Year: 2017).*
Quan—WO 2018-120225A1 (Year: 2018).*
Extended European Search Report dated Jul. 10, 2020, issued in a counterpart European Application No. 18860148.8-1212 / 3675567.
Samsung: "CN selection for E-UTRAN connected to 5G CN", 3GPP Draft; R2-1707749 LTE 5GCN Selection V06, 3rd Generation Partnership Project (3GPP), vol. RAN WG2, No. XP051317711; Aug. 20, 2017, Berlin, Germany.
Ericsson: "CN selection when accessing", 3GPP Draft; R2-1704177—CN Selection When Accessing, 3rd Generation Partnership Project (3GPP), vol. RAN WG2, No. XP051274776; May 14, 2017, Hangzhou, China.
Catt: "CN Type Selection in LTE Connectivity to 5G-CN", 3GPP Draft; R2-1708245, 3rd Generation Partnership Project (3GPP), vol. RAN WG2, No. XP051318146; Aug. 20, 2017, Berlin, Germany.

* cited by examiner

METHOD AND APPARATUS FOR SELECTING CORE NETWORK SUITABLE FOR SERVICE IN NEXT GENERATION MOBILE COMMUNICATION SYSTEM

TECHNICAL FIELD

The disclosure relates to a method for selecting a core network suitable for a service in a wireless communication system, and more specifically in 3GPP 5G new radio (NR) technology.

BACKGROUND ART

To meet the demand for wireless data traffic having increased since the deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered as an example of convergence between the 5G technology and the IoT technology.

DETAILED DESCRIPTION OF INVENTION

Technical Problem

In the next generation mobile communication system, if a new radio (NR) core network (5G or NR NG Core) can be connected to a base station using LTE radio access technology and a base station using NR radio access technology, a terminal should be connected to a 5G CN (NR core network) and an EPC (LTE core network) at the same time (basically, a base station using LTE radio access technology can be connected to the LTE core network and a base station using NR radio access technology can be connected to the NR core network). That is, the terminal should be able to use an evolved packet core (EPC) and a 5G core network (CN) non-access stratum (NAS). That is because the terminal may be connected to both the base station using LTE radio access technology and the base station using NR radio access technology, and each base station may be connected to both the LTE core network and the NR (5G) core network, as described above.

For example, if a terminal which can be connected to the 5G CN is connected to a network, the terminal can always select the 5G CN NAS. However, the 5G CN may not support a particular function (e.g., MBMS) supported by the EPC of LTE. On the other hand, if a terminal which can be connected to the EPC is connected to the network, the terminal may always select the EPC. However, the EPC may not support QoS or slice (RAN slice or network slice) service supported by the 5G CN. In addition, if the same terminal is registered in both the EPC and the 5G CN, the terminal may receive different services supported thereby. Accordingly, even a terminal having already been registered in the 5G CN may be required to reestablish registration in the EPC as necessary, and the terminal may efficiently select the 5G CN or the EPC according to a service desired to be received by the terminal, so as to quickly provide various services without the need for core network reconfiguration.

Solution to Problem

In order to solve the above problems, a method performed by a terminal in a wireless communication system according to an embodiment of the disclosure may include: receiving, from a base station, system information including a public land mobile network (PLMN) list and information on a type of a core network related to each PLMN; selecting, by a non-access stratum (NAS) layer of the terminal, a core network type to be accessed by the terminal, based on the system information; and transmitting, to the base station, a message including information associated with the selected core network type.

In addition, a method performed by a base station in a wireless communication system according to an embodiment of the disclosure may include: transmitting, to a terminal, system information including a public land mobile network (PLMN) list and information on a type of a core network related to each PLMN; and receiving, from the terminal, information associated with a core network type selected by a non-access stratum (NAS) layer of the terminal based on the system information.

In addition, a terminal in a wireless communication system according to an embodiment of the disclosure may include a transceiver, and a controller configured to: control the transceiver to receive, from a base station, system information including a public land mobile network (PLMN) list and information on a type of a core network related to each PLMN; select a core network to be accessed by the terminal based on the system information, by a non-access stratum (NAS) layer of the terminal; and control the transceiver to transmit a message including information associated with the selected core network type.

In addition, a base station in a wireless communication system according to an embodiment of the disclosure may include a transceiver, and a controller configured to control the transceiver to transmit, to a terminal, system information including a public land mobile network (PLMN) list and information on a type of a core network related to each PLMN; and control the transceiver to receive, from the terminal, information associated with a core network type selected by a non-access stratum (NAS) layer of the terminal based on the system information.

Advantageous Effects of Invention

The disclosure proposes a method for efficiently selecting or reselecting an EPC or 5G CN, as necessary, by a terminal that can be connected to a 5G CN (NR core network) and an EPC (LTE network) in a next generation mobile communication system, so as to specify a core network selection or reselection process. In addition, in a case of functions or services which are not supported by the 5G CN, the terminal may move a connection to an EPC so as to receive functions or services supported thereby, or in a case of functions or services which are not supported by the EPC, the terminal may move a connection to the 5G CN so as to receive functions or services supported thereby.

MODE FOR THE INVENTION

Figure 1:
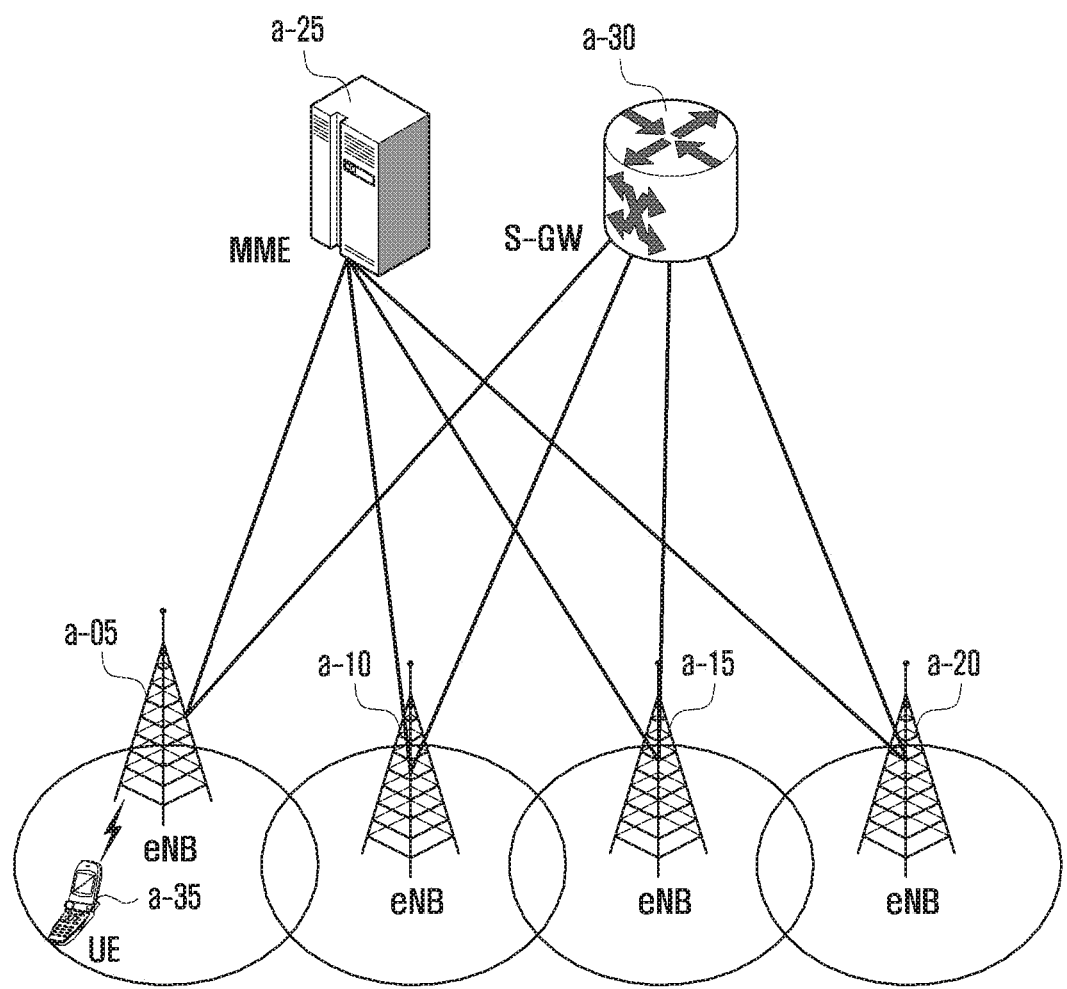
FIG. 1 illustrates the structure of an LTE system used for reference to describe the disclosure.

In describing embodiments according to the disclosure, descriptions related to technical contents well-known in the art and not associated directly with the disclosure will be omitted. Such an omission of unnecessary descriptions is intended to prevent obscuring of the main idea according to the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features according to the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope according to the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters.

The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

FIG. 1 illustrates the structure of an LTE system used for reference to describe the disclosure.

Referring to FIG. 1, as shown, a radio access network of an LTE system includes a next-generation base station (evolved Node B, hereinafter referred to as eNB, Node B, or base station) a-05, a-10, a-15, and a-20, a mobility management entity (MME) a-25, and a serving-gateway (S-GW) a-30. The user equipment (hereinafter referred to as UE or terminal) a-35 is connected to an external network through the eNBs a-05 to a-20 and the S-GW a-30.

In FIG. 1, the eNBs a-05 to a-20 correspond to legacy Node Bs of a UMTS system. The eNB is connected to the UE a-35 through a radio channel and plays a more complicated role than the legacy Node B. In an LTE system, since all user traffic, including real-time services such as voice over IP (VoIP) over the Internet protocol, is serviced through a shared channel, there is a need for a device that performs scheduling by collecting state information, such as buffer states, available transmit power states, and channel state of UEs. The eNBs a-05 to a-20 are in charge of such function of the device.

One eNB generally controls a plurality of cells. For example, in order to realize a transmission rate of 100 Mbps, the LTE system uses orthogonal frequency division multiplexing (hereinafter, referred to as OFDM) scheme in a 20 MHz bandwidth, as a radio access technology. In addition, an adaptive modulation & coding (hereinafter referred to as AMC) scheme that determines a modulation scheme and a channel coding rate according to the channel state of a UE is employed. The S-GW a-30 is a device for providing a data bearer, and generates or removes a data bearer under the control of the MME a-25. The MME is a device that is in charge of various control functions as well as a mobility management function for the UE and is connected to a plurality of base stations.

Figure 2:
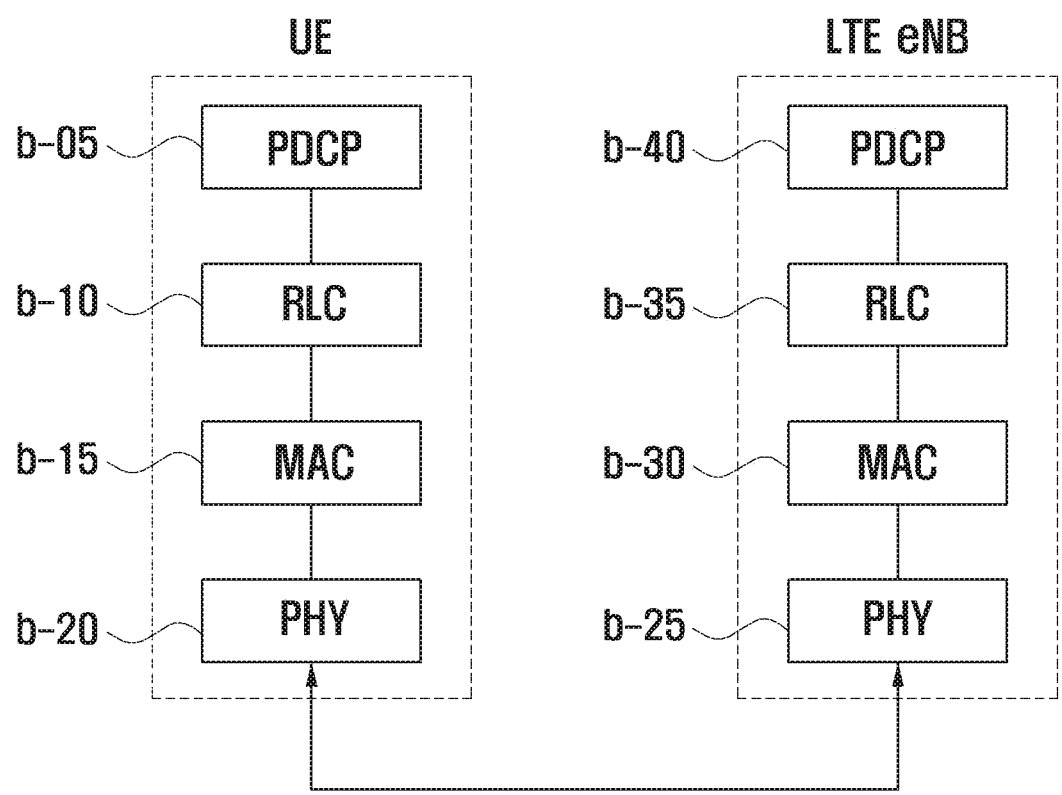
FIG. 2 illustrates a radio protocol structure in an LTE system used for reference to describe disclosure.

FIG. 2 illustrates a radio protocol structure in an LTE system used for reference to describe the disclosure.

Referring to FIG. 2, a radio protocol of an LTE system includes, for each of a UE and an eNB, packet data convergence protocols (PDCPs) b-05 and b-40, radio link controls (RLCs) b-10 and b-35, and medium access controls (MAC)s b-15 and b-30. PDCPs b-05 and b-40 are in charge of an operation such as IP header compression/reconstruction. The main functions of PDCP are summarized as follows.
  Header compression and decompression (ROHC only)
  Transfer of user data
  In-sequence delivery of upper layer PDUs at PDCP re-establishment procedure for RLC AM
  For split bearers in DC (only support for RLC AM): PDCP PDU routing for transmission and PDCP PDU reordering for reception
  Duplicate detection of lower layer SDUs at PDCP re-establishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink The radio link controls (hereinafter referred to as RLCs) b-10 and b-35 reconfigure a PDCP packet data unit (PDU) to an appropriate size to perform an ARQ operation. The main functions of RLCs are summarized as follows.
  Transfer of upper layer PDUs
  Error Correction through ARQ (only for AM data transfer)
  Concatenation, segmentation and reassembly of RLC SDUs (only for UM and AM data transfer)
  Re-segmentation of RLC data PDUs (only for AM data transfer)
  Reordering of RLC data PDUs (only for UM and AM data transfer)
  Duplicate detection (only for UM and AM data transfer)
  Protocol error detection (only for AM data transfer)
  RLC SDU discard (only for UM and AM data transfer)
  RLC re-establishment The MACs 1b-15 and 1b-30 are connected to multiple RLC layer devices configured in one terminal, and may perform an operation of multiplexing RLC PDUs with an MAC PDU and demultiplexing the RLC PDUs from the MAC PDU. The main functions of the MAC are summarized as follows.
  Mapping between logical channels and transport channels
  Multiplexing/demultiplexing of MAC SDUs belonging to one or different logical channels into/from transport blocks (TB) delivered to/from the physical layer on transport channels
  Scheduling information reporting
  Error correction through HARQ
  Priority handling between logical channels of one UE
  Priority handling between UEs by means of dynamic scheduling
  MBMS service identification
  Transport format selection
  Padding Physical layers 1b-20 and 1b-25 may perform an operation of channel coding and modulating higher layer data, generating the higher layer data into an OFDM symbol, transmitting the OFDM symbol through a radio channel, or demodulating an OFDM symbol received through a radio channel, channel-decoding the OFDM symbol, and transmitting the OFDM symbol to a higher layer.

Figure 3:
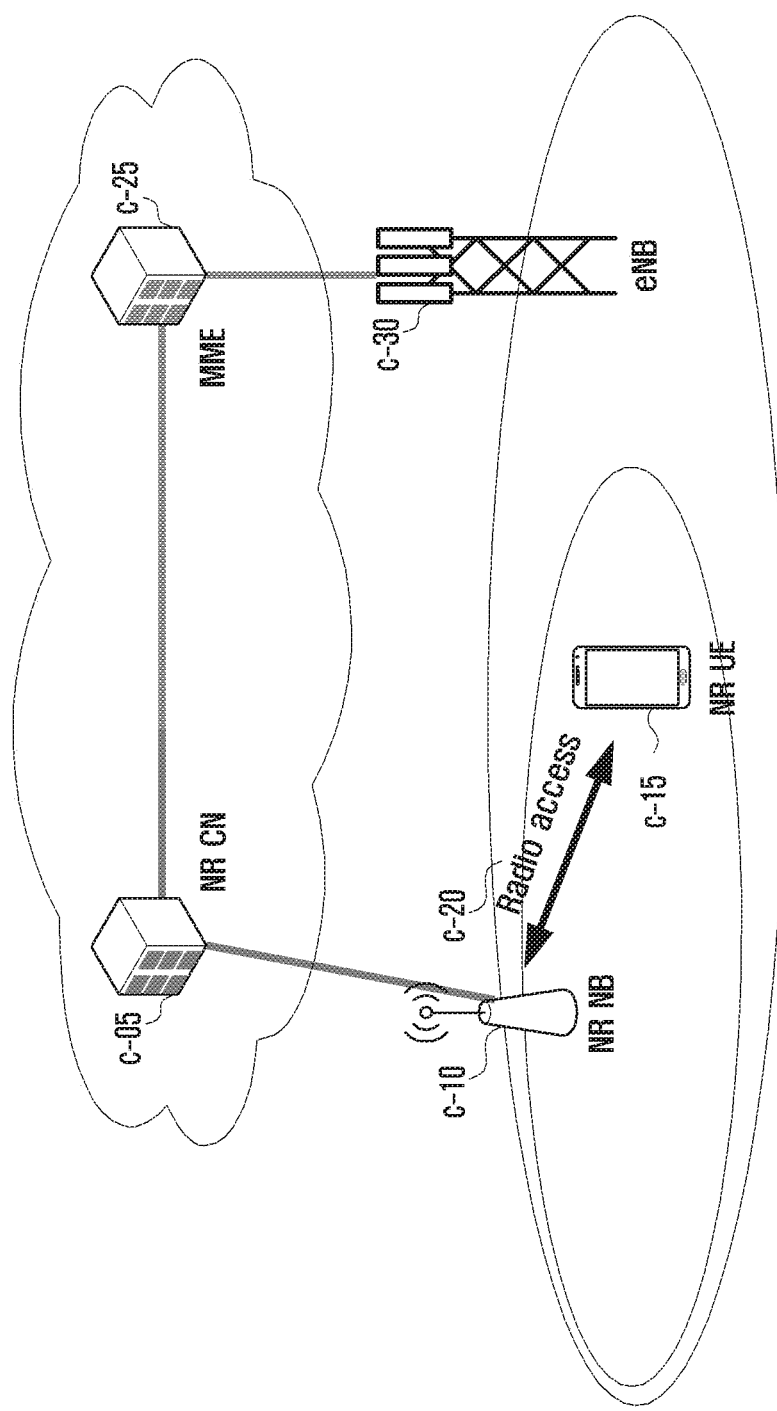
FIG. 3 illustrates a structure of a next generation mobile communication system to which the disclosure is applied.

FIG. 3 illustrates a structure of a next generation mobile communication system to which the disclosure may be applied.

Referring to FIG. 3, a radio access network of a next generation mobile communication system includes a next generation base station (new radio node B (hereinafter referred to as NR NB) 1c-10 and a new radio core network (NR CN) (or new generation core network (NG CN)) 1c-05. A user equipment (a new radio user equipment, hereinafter referred to as NR UE or a terminal) c-15 accesses an external network via NR NB c-10 and NR CN c-05.

In FIG. 3, the NR gNB c-10 corresponds to an evolved node B (eNB) of the legacy LTE system. The NR NB is connected to the NR UE c-15 via a radio channel and may provide an excellent service as compared to the legacy node B. In the next generation mobile communication system, since all types of user traffics are serviced through a shared channel, there is a need for a device for performing scheduling by collecting state information, such as buffer states, available transmission power states, and channel states of UEs. Further, the NR NB C-10 is in charge of such function of the device.

In general, one NR NB controls a plurality of cells. In order to implement ultra-high speed data transmission as compared to the legacy LTE, the NR NB may have the legacy maximum bandwidth or more, and may additionally employ beamforming technology using an orthogonal frequency division multiplexing (OFDM) as a radio access technology. In addition, the NR NB adopts an adaptive modulation & coding (hereinafter referred to as AMC) scheme that determines a modulation scheme and a channel coding rate based on the channel state of a UE. The NR CN c-05 performs functions, such as mobility support, bearer setup, and QoS setup. The NR CN is a device that is in charge of various control functions as well as a mobility management function for a UE, and is connected to a plurality of base stations. In addition, the next generation mobile communication system may also operate in conjunction with the legacy LTE system, and the NR CN is connected to an MME c-25 via a network interface. The MME is connected to an eNB c-30, that is, the legacy base station.

Figure 4:
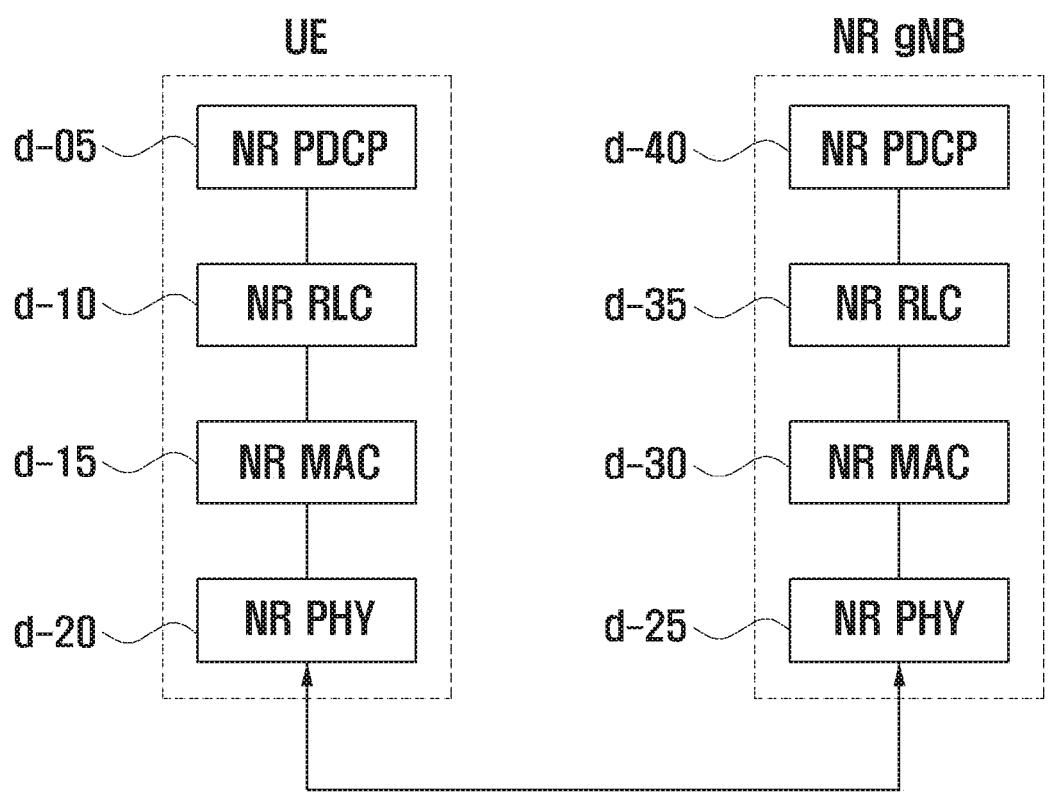
FIG. 4 illustrates a radio protocol structure of a next generation mobile communication system to which the disclosure is applied.

FIG. 4 illustrates radio protocol architecture of a next generation mobile communication system to which the disclosure may be applied.

Referring to FIG. 4, the radio protocol of the next generation mobile communication system includes, for each of a UE and an NR base station, NR PDCPs d-05 and d-40, NR RLCs d-10 and d-35, and NR MACs d-15 and d-30. The main function of the NR PDCPs d-05 and d-40 may include some of the following functions.

Header compression and decompression (ROHC only)
Transfer of user data
In-sequence delivery of higher layer PDUs
PDCP PDU reordering for reception
Duplicate detection of lower layer SDUs
Retransmission of PDCP SDUs
Ciphering and deciphering
Timer-based SDU discard in uplink The reordering function of the NR PDCP device refers to a function of sequentially reordering PDCP PDUs, received from a lower layer, based on a PDCP sequence number (SN), and may include a function of transmitting data to a higher layer in the sequence of reordering, a function of reordering the sequence and recording missing PDCP PDUs, a function of providing a state report on the missing PDCP PDUs to a transmission side, and a function of requesting retransmission for the missing PDCP PDUs.

The main functions of the NR RLCs d-10 and d-35 may include some of the following functions.

Transfer of higher layer PDUs
In-sequence delivery of higher layer PDUs
Out-of-sequence delivery of higher layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The in-sequence delivery function of the NR RLC device refers to a function of transmitting RLC SDUs, received from a lower layer, to a higher layer in the sequence of reception, and may include: if one RLC SDU is originally segmented into multiple RLC SDUs and received, a function of reassembling and transmitting the multiple RLC SDUs; a function of reordering the received RLC PDUs based on an RLC sequence number (SN) or PDCP SN; a function of reordering the sequence and recording missing RLC PDUs; a function of providing a state report on the missing RLC PDUs to a transmission side; and a function of requesting retransmission for the missing RLC PDUs. Alternatively, if the missing RLC SDU occurs, the in-sequence delivery function of the NR RLC device may include a function of sequentially transmitting only the RLC SDUs prior to the missing RLC SDU to a higher layer or sequentially transmitting all the RLC SDUs received before a timer starts to a higher layer if the timer expires although there is a missing RLC SDU, or sequentially transmitting all RLC SDUs received so far to a higher layer if a predetermined timer expires although there is a missing RLC SDU.

In addition, the RLC PDUs may be processed in the sequence that the RLC PDUS are received (in the sequence of arrival regardless of the sequence of serial number and sequence number), and be transmitted to a PDCP device out-of-sequence delivery. For segments, the in-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer or may be replaced by a multiplexing function of the NR MAC layer.

The out-of-sequence delivery function of the NR RLC device refers to a function of directly transmitting the RLC SDUs, received from the lower layer, to a higher layer regardless of the order, and may include, if one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and recording the missing RLC PDUs.

The NR MACs d-15 and d-30 may be connected to multiple NR RLC layer devices configured in one UE, and a main function of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers d-20 and d-25 may perform an operation of channel-coding and modulating higher layer data, generating the higher layer data into an OFDM symbol, transmitting the OFDM symbols via a radio channel, or demodulating and channel decoding of the OFDM symbols received via the radio channel, and transferring the OFDM symbol to a higher layer.

Figure 5:
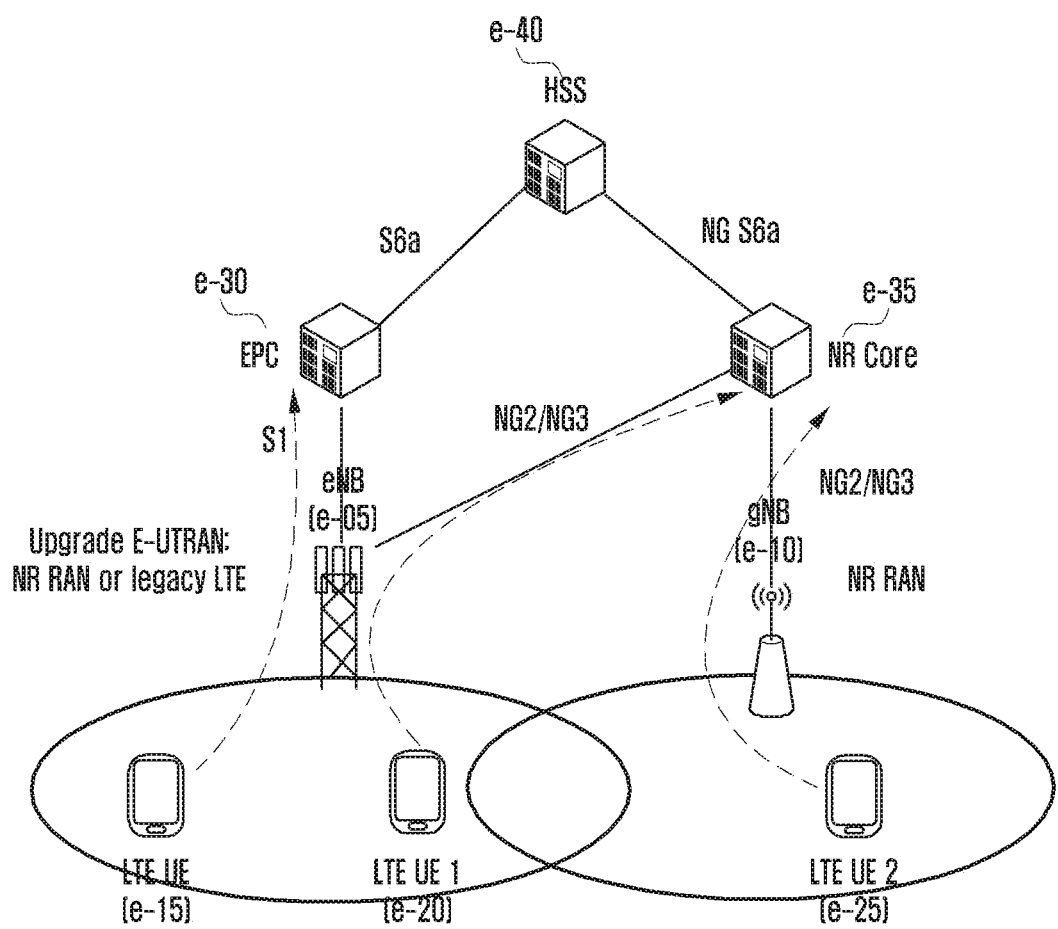
FIG. 5 illustrates a method by which a terminal is connected to an EPC (LTE core network) and a 5G CN (5G core network or NR core network) in a next generation mobile communication system according to the disclosure.

FIG. 5 illustrates a method by which a UE is connected to an EPC (LTE core network) and a 5G core network (5G CN or NR core network) in a next generation mobile communication system according to the disclosure.

As shown in FIG. 5, in the next generation mobile communication system, a 5G core network e-35 can be connected to a base station (eNB) e-05 using LTE radio access technology and a base station (gNB) e-10 using NR radio access technology, and UEs e-20 and e-25, which can be connected to a 5G CN, should be able to be connected to each of the 5G CN e-35 and EPC e-30. That is, the UEs should be able to access both the EPC and the non-access stratum (NAS) of the 5G CN.

For example, if a UE which can be connected to the 5G CN is connected to a network, the UE can always select the 5G CN NAS. However, the 5G CN may not support a particular function (e.g., MBMS) supported by the EPC of LTE (or vice versa, the EPC of LTE may not support a particular function such as a slice (network slice, or RAN slice) provided by the 5G CN). The slice function may be a service for specializing any service and providing a dedicated network, a dedicated radio access transmission resource, or a dedicated data link to satisfy QoS or requirements suitable for the service. A plurality of slices may be configured in a core network (non-access stratum (NAS)) or a radio access technology (access stratum (AS)).

In addition, even if the same UE is registered in both the EPC and the 5G CN, the UE may receive different services supported thereby. Therefore, even a UE having already been registered in the 5G CN may be required to reestablish registration in the EPC as necessary, and on the contrary, even a UE having already been registered in the EPC may be required to reestablish registration in the 5G CN as necessary. In addition, an LTE UE e-15 having only EPC-connectable UE capability may receive a service only through the connection to the EPC.

In order to enable the base station to be connected to both the 5G CN and the EPC, a new 5G base station (gNB) needs to be used, or an eNB, which is the conventional LTE base station (for example, an eLTE base station, and enhanced LTE eNB), needs to be upgraded for the connection to the 5G CN.

In the disclosure, if the UE can access both the EPC and the 5G CN at the initial access in a situation considered in FIG. 5, a process in which the UE selects the EPC or the 5G CN, a process in which the UE having already been registered in the 5G CN reestablish registration in the EPC as necessary, or a process in which the UE having already been registered in the EPC reestablish registration in the 5G CN as necessary, that is, a core network selection/reselection process is specified. Detailed operations will be described later in more detail in the following embodiment.

Figure 6:
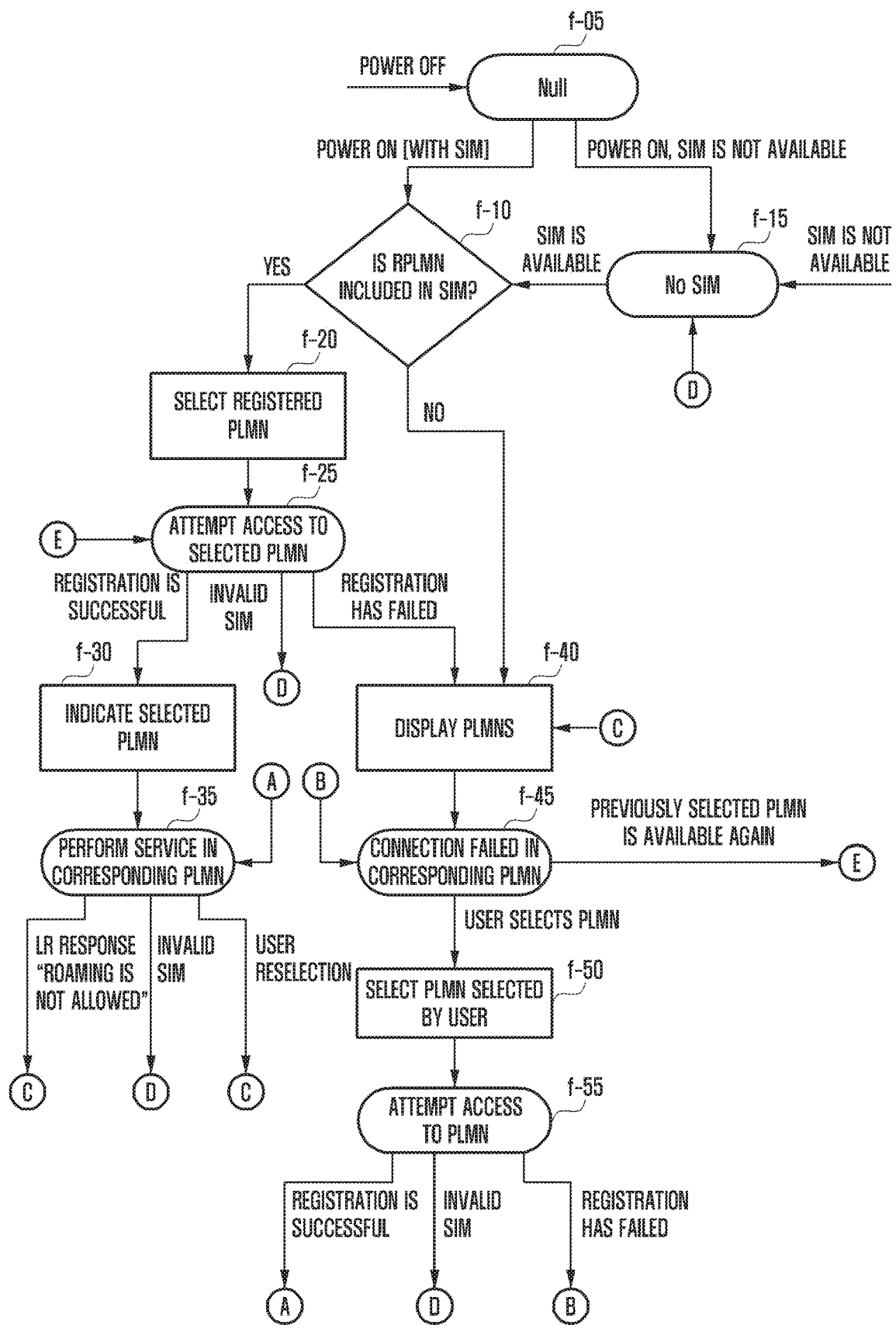
FIG. 6 illustrates a first embodiment of a method of selecting a PLMN by a UE proposed by the disclosure.

FIG. 6 illustrates a first embodiment of a method of selecting a PLMN by a UE proposed by the disclosure.

In a first embodiment of the disclosure, a method of searching for and determining a public land mobile network (PLMN) is either automatically performed by an access stratum (AS) or triggered through and manually performed by the NAS. In general, a UE operates in a home PLMN (HPLMN) or an equivalent home PLMN (EHPLMN), but a visited PLMN (VPLMN) may be selected. Basically, the AS layer reports all pieces of PLMN-related information including a list of connectable PLMNs to the NAS and performs an additional PLMN selection operation based on priority information. That is, for PLMN selection, the UE scans E-UTRA bands through all radio frequency (RF) channels suitable for capability, searches for a valid PLMN, reads system information in a cell having the highest signal strength, and performs a PLMN selection process according to the PLMN list provided by the cell.

FIG. 6 illustrates a basic PLMN selection process in a manual mode. If a UE is powered on in operation f-05, the UE identifies whether there are registered PLMNs (RPLMNs) around the UE in operation f-10. If the powered-on UE does not include a subscriber identity module (SIM) or the SIM is not valid, a state of the UE is maintained until the SIM becomes valid in operation f-15. If the UE finds the RPLMN and selects the PLMN in operation f-20, the UE attempts to access the corresponding PLMN in operation f-25, and if the registration and connection are successfully completed, the UE indicates the connected PLMN in operation f-30 and performs a service in the corresponding PLMN in operation f-35. However, if the registration and connection are failed in operation f-40, the UE cannot be connected to the corresponding PLMN in operation f-45 and attempts to access the PLMN, which is selected based on the priority in operation f-50, in operation f-55.

The PLMN selection process based on the priority follows the following priorities.

1. If an EHPLMN list exists, select a high-priority EHPLMN; and if an EHPLMN list does not exist, select an HPLMN.
2. Select a combination of PLMNs stored in a SIM and controlled by a UE.
3. Select a combination of PLMNs stored in a SIM and controlled by a service provider.
4. A combination of PLMNs having high received signal performance (determined in random order)
5. A combination of PLMNs arranged in descending order of received signals.
  1. Available HPLMN list
  2. Available PLMN/access technology list from the user controlled SIM data file
  3. Available PLMN/access technology list from the operator controlled SIM data file
  4. Available PLMN/access technology list with the highest received signal
  5. Available PLMN/access technology list in order of decreased signal quality FIG. 7 illustrates a method for transmitting information of a CN type or a slice type, preferred by a terminal, to a NAS, and efficiently selecting/reselecting a core network (EPC or 5G CN) by a CN (5G CN or EPC) according to a first embodiment proposed by the disclosure.

Figure 7:
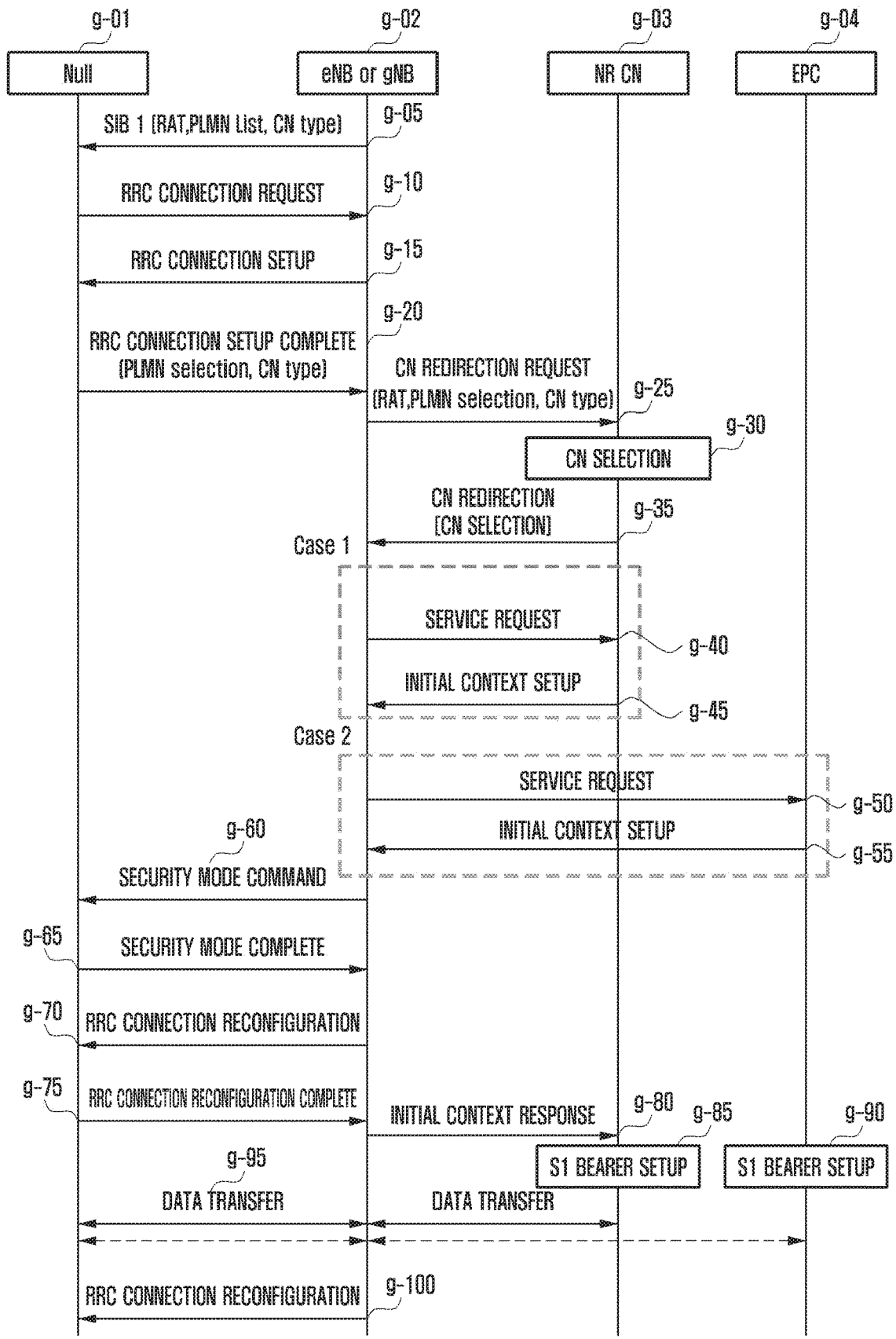
FIG. 7 illustrates a method for transmitting information of a CN type or a slice type, preferred by a terminal, to a NAS, and efficiently selecting/reselecting a core network (EPC or 5G CN) by a CN (5G CN or EPC) according to a first embodiment proposed by the disclosure.

In FIG. 7, a UE g-01 is a UE having UE capability which can be connected to a 5G CN and an EPC. The UE g-01 performs initial cell search, camps on the cell, and receives system information (for example, SIB1) in operation g-05, and identifies whether the corresponding cell is an HPLMN. The cell g-02 may be a 5G base station (gNB) or an LTE base station, or may be an upgraded eLTE base station (eLTE eNB) having a function of being connected to a 5G CN.

In addition, the system information (e.g., SIB 1) may include radio access technology (RAT) information indicating which radio access technology is used (e.g., 5G radio access technology or LTE radio access technology), a PLMN list (for example, PLMN lists corresponding to the radio access technology), and a connectable CN type (for example, a CN type which can be applied to each PLMN, that is, a 5G CN or an EPC).

The system information may include a slice type (for example, a slice type provided by the CN type) information. As the radio access technology information, the PLMN list, and the CN type information are provided through the system information, radio access technology information, the PLMN list, the CN type, or the slice information, which the initial accessed UE can access, may be identified and preferred RAT information, PLMN list, CN type, or slice information suitable for the service which the UE desires to currently receive may be selected.

In the next generation mobile communication system, even a UE having already registered in the 5G CN may be required to reestablish registration in the EPC as necessary (or vice versa, even a UE having already been registered in the EPC may be required to reestablish registration in the 5G CN as necessary). Accordingly, it is possible to provide a CN type or a slice type according to each radio access and each PLMN for a core network (CN) reconfiguration function.

Upon receiving the system information, the UE selects a PLMN, camps on the selected PLMN, and receives the remaining system information. The method of determining the PLMN may be determined based on the first embodiment of a PLMN selection method of a UE proposed in FIG. 6.

The PLMN determination method of the UE may be determined based on a second embodiment of a PLMN selection method of a UE according to the disclosure proposed below, rather than the first embodiment of a method of selecting a PLMN by the UE according to the disclosure.

In the second embodiment of a PLMN selection method of a UE according to the disclosure, the method for searching for and determining the PLMN may be performed automatically by an AS (Access Stratum) or triggered through and manually performed by the NAS.

In general, the UE operates in a home PLMN (HPLMN) or an equivalent home PLMN (EHPLMN), but a VPLMN may be selected. Basically, the AS layer reports, to the NAS, all pieces of PLMN-related information including RAT information (for example, 5G radio access technology or LTE radio access technology) indicating which radio access technology is used, a list of connectable PLMNs (for example, a list of PLMNs corresponding to the RATs), connectable CN type (for example, a CN type which can be applied to each PLMN, that is, the 5G CN or the EPC), or a slice type (for example, a slice type provided by the CN type) information, and performs an additional PLMN selection operation based on priority information.

That is, for the PLMN selection, the UE scans E-UTRA bands through all RF channels suitable for the capability, searches for a valid PLMN, reads system information in a cell having the highest signal strength, and performs a PLMN selection process according to a PLMN list provided by the cell.

The UE may perform a procedure similar to the first embodiment of the PLMN selection method of the UE. However, the UE may select a PLMN based on the following priority and attempt access.

In the disclosure, the PLMN selection process based on the priority of the PLMN selection method of the UE according to the second embodiment follows the following priorities.

1. If an EHPLMN list exists, select a high-priority EHPLMN; and if an EHPLMN list does not exist, select an HPLMN.

2. Select a combination of PLMNs/radio access technologies/CN types, which are stored in a SIM and controlled by a UE.

3. Select a combination of PLMNs/radio access technologies/CN types, which are stored in a SIM and controlled by a service provider.

4. Select a combination of PLMNs stored in a SIM and controlled by a
UE.

5. Select a combination of PLMNs stored in a SIM and controlled by a service provider.

6. A combination of PLMNs having high received signal performance (determined in random order)

7. A combination of PLMNs arranged in descending order of received signals.

1. Available HPLMN list

2. Available PLMN/access technology/CN type list from the user controlled SIM data file 3. Available PLMN/access technology/CN type list from the operator controlled SIM data file 4. Available PLMN/access technology list from the user controlled SIM data file 5. Available PLMN/access technology list from the operator controlled SIM data file 6. Available PLMN/access technology list with the highest received signal 7. Available PLMN/access technology list in order of decreased signal quality In the disclosure, the PLMN selection process based on the priority of a PLMN selection method of a UE according to a third embodiment follows the following priorities.

1. If an EHPLMN list exists, select a high-priority EHPLMN; if an EHPLMN list does not exist, select an HPLMN.

2. Select a combination of PLMNs/radio access technologies/CN types/slice types, which are stored in a SIM and controlled by a UE.

3. Select a combination of PLMNs/radio access technologies/CN types/slice types, which are stored in a SIM and controlled by a service provider.

4. Select a combination of PLMNs/radio access technologies/CN types, which are stored in a SIM and controlled by a UE.

5. Select a combination of PLMNs/radio access technologies/CN types, which are stored in a SIM and controlled by a service provider.

6. Select a combination of PLMNs stored in a SIM and controlled by a UE.

7. Select a combination of PLMNs stored in a SIM and controlled by a service provider.

8. A combination of PLMNs having high received signal performance (determined in random order)

9. A combination of PLMNs arranged in descending order of received signals.

1. Available HPLMN list

2. Available PLMN/access technology/CN type list/slice type from the user controlled SIM data file 3. Available PLMN/access technology/CN type list/slice type from the operator controlled SIM data file 4. Available PLMN/access technology/CN type list from the user controlled SIM data file 5. Available PLMN/access technology/CN type list from the operator controlled SIM data file 6. Available PLMN/access technology list from the user controlled SIM data file 7. Available PLMN/access technology list from the operator controlled SIM data file 8. Available PLMN/access technology list with the highest received signal 9. Available PLMN/access technology list in order of decreased signal quality As described above, according to the PLMN selection method of the UE according to the second embodiment and the third embodiment, the UE may select preferred radio access technology, PLMN list, CN type, slice type suitable for a service which the UE desires to receive, in consideration of information, such as radio access technology, a PLMN list, a CN type, and a slice type. For example, if there is a preferred CN type, the UE may select a PLMN and a radio access technology supporting the preferred CN type, if there is a preferred slice type, the UE may select a CN type, a PLMN, and a radio access technology supporting the preferred slice type.

If data to be transmitted is generated by a UE, a connection of which is not currently established (hereinafter, referred to as an idle-mode UE), the UE performs a radio resource control (RRC) connection establishment process with a base station. The UE establishes backward transmission synchronization with the base station through a random access procedure and transmits an RRCConnectionRequest message to the base station in operation g-10. The message includes a cause (establishmentCause) to establish a connection with an identifier of the UE.

The base station transmits an RRC connection setup message (RRCConnectionSetup) to allow the UE to establish the RRC connection in operation g-15. The message includes RRC connection configuration information and the like. The RRC connection is also referred to as a signaling radio bearer (SRB), and is used for transmitting or receiving an RRC message, which is a control message between the UE and the base station.

After establishing the RRC connection, the UE transmits an RRC connection setup complete message (RRCConnetionSetupComplete) to the base station in operation g-20. The message may include a control message called a "SERVICE REQUEST" requesting an MME to perform a bearer setup for a predetermined service. The UE may include, in the message, a preferred PLMN, CN type information, slice information, and the like. Further, in the disclosure, the SERVICE REQUEST control message may include both an indicator indicating the selected PLMN and CN type information or slice type information in the corresponding PLMN.

The base station transmits a SERVICE REQUEST message g-40 or a CN redirection request (CN-RE-DIRECTION REQUEST) control message (g-25) including an PLMN indicator or CN type information, which is included in the RRC connection setup complete message (RRCConnetionSetupComplete), to the currently connected MME (the present embodiment is based on an assumption that a connection to a 5G CN has been established. If a connection to the EPC has been established, the 5G CN may be replaced by the EPC in all the operations performed thereafter).

The CN RE-DIRECTION REQUEST control message g-25 may be transmitted while including the same contents as that of the SERVICE REQUEST message g-40. The CN having received the control message selects an appropriate CN according to a predetermined method in operation g-30. The selection may be determined according to a predetermined priority, or may be determined according to a UE type and establishmentCause, that is, the service type.

The initially configured CN determines whether to maintain the current CN connection or receive a change to another CN according to the determined method, and stores a result of the determination in a CN RE-DIRECTION control message and transmits the CN RE-DIRECTION control message to the base station (g-35). In this process, the base station may identify preference of the UE and determine whether to configure/connect or reconfigure/reconnect to the 5G CN or the EPC. Alternatively, in this process, the MME may identify preference of the UE and determine whether to configure/connect or reconfigure/reconnect to the 5G CN or the EPC. Alternatively, in this process, the core network may identify preference of the UE and determine whether to configure/connect or reconfigure/reconnect to the 5G CN or the EPC.

The CN RE-DIRECTION control message (g-35) may be transmitted while including only information on the determined CN, or being included in an INITIAL CONTEXT SETUP message (g-45), or may be transmitted while including information that needs to be included in the INITIAL CONTEXT SETUP message (g-45).

If the CN should be changed, the base station transmits, to the CN that needs to be changed (the "EPC" in the present embodiment), a control message (g-50) called "SERVICE REQUEST" requesting the MME to perform bearer setup for a predetermined service of the UE, and the MME determines whether to provide the service requested by the UE.

As a result of the determination, if it is determined to provide a service requested by the UE, the changed MME transmits a message (g-55) called INITIAL CONTEXT SETUP REQUEST to the base station. The message includes information, such as quality of service (QoS) information to be applied to data radio bearer (DRB) setup and security-related information (for example, a security key and a security algorithm) to be applied to the DRB.

The base station exchanges a security mode command message (securitymodecommand) (g-60) and a security mode complete message (SecurityModeComplete) (g-65) with the UE in order to establish security.

If the security establishment has been completed, the base station transmits an RRC connection reconfiguration message (RRCConnectionReconfiguration) to the UE in operation g-70. The message includes configuration information of the DRB for processing user data, and the UE configures the DRB by applying the information and transmits an RRC connection reconfiguration complete message (RRCConnectionReconfigurationComplete) to the base station in operation g-75.

After completing DRB setup with the UE, the base station transmits an initial context setup complete message (INITIAL CONTEXT SETUP COMPLETE) to the MME in operation g-80, and the MME, which has received the INITIAL CONTEXT SETUP COMPLETE message, exchanges an S1 BEARER SETUP message and an S1 BEARER SETUP RESPONSE message in order to establish S1 bearer with the serving gateway (S-GW). The S1 bearer is a connection for data transmission, which is established between the S-GW and the base station, and the S1 bearer corresponds to the DRB in one-to-one basis in operation g-85 or g-90.

If the above process is completed, the UE transmits or receives data to or from the base station through the S-GW in operation g-95. As described above, a general data transmission process largely includes three operations of: RRC connection setup, security setup, and DRB setup. In addition, the base station may transmit an RRCConnectionReconfiguration message to the UE in order to newly perform, add, or change the configuration thereof in operation g-100.

Figure 8A:
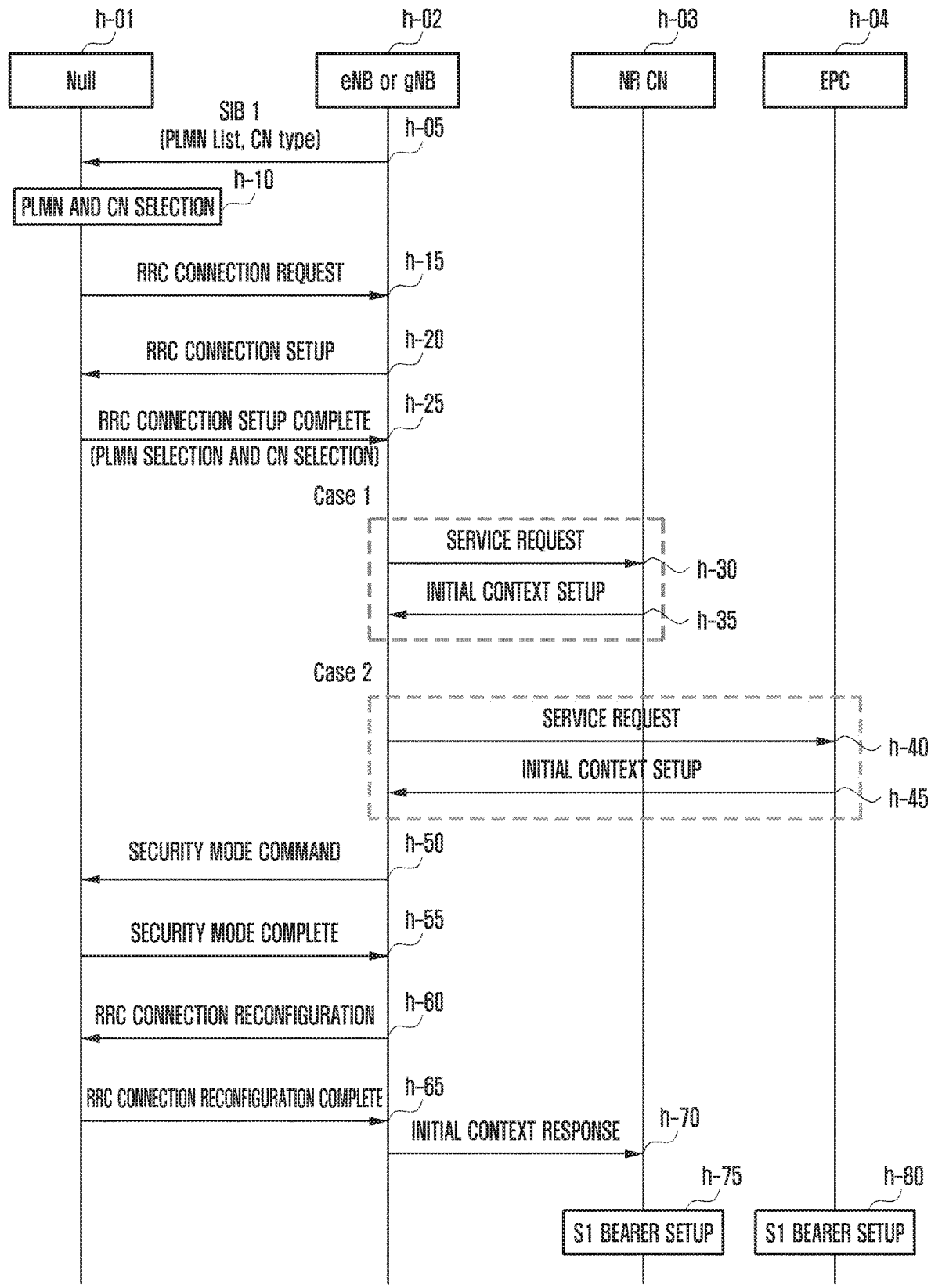
FIGS. 8A and 8B illustrate a method for reconfiguring a core network (5G CN or EPC) by selecting a CN type or a slice type preferred by a terminal and indicating a result of selection, according to a second embodiment proposed by the disclosure.
Figure 8B:
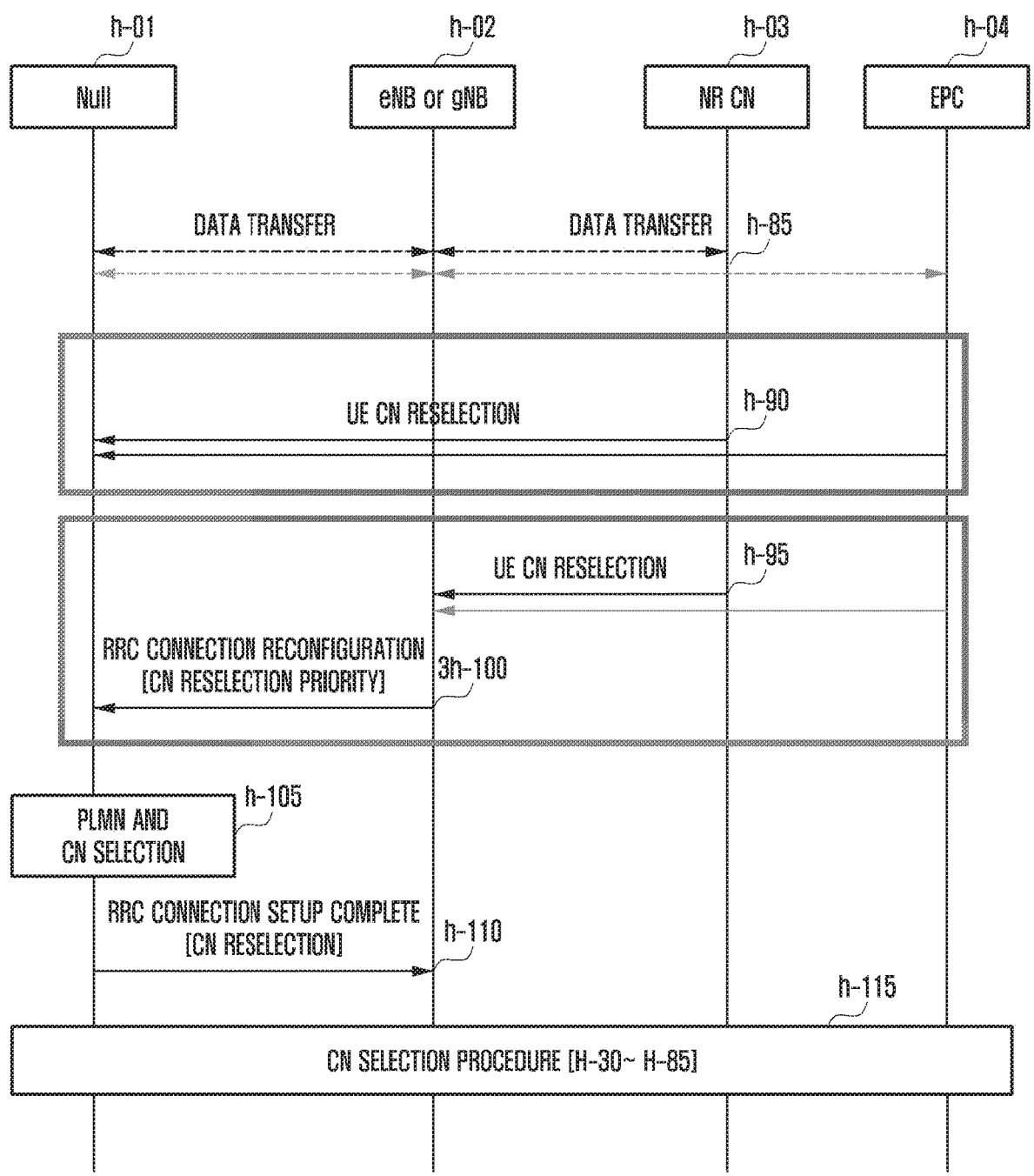

FIGS. 8A and 8B illustrate a method for reconfiguring a core network (5G CN or EPC) by selecting a CN type or slice type preferred by a UE and indicating a result of the selection according to a second embodiment proposed by the disclosure.

In FIGS. 8A and 8B, a UE h-01 has UE capability to be connected to NR, receives SIB1 for initial cell search in operation h-05, and identifies whether the corresponding cell is an HPLMN. The cell h-02 may be an NR base station (gNB) or an LTE base station, or may be an upgraded eLTE base station (eLTE eNB) having a function of being connected to a 5G CN.

Further, the system information (e.g., SIB1) may include a PLMN List and a CN type or slice type applicable to each PLMN. That is, the system information may include radio access technology (RAT) information (for example, 5G radio access technology or LTE radio access technology) indicating which radio access technology is used, a PLMN list (for example, PLMN lists corresponding to the radio access technologies), and a connectable CN type (for example, a CN type which can be applied to each PLMN, i.e. a 5G CN or an EPC).

Furthermore, the system information may include a slice type (for example, a slice type provided by the CN type) information. The RAT information, the PLMN list, and the CN type information are provided through the system information, so that the radio access technology information, the PLMN list, the CN type, or the slice information, which the initial accessed UE can access, may be detected and preferred radio access technology information, PLMN list, CN type, or slice information suitable for the service which the UE desires to currently receive may be selected.

In the next generation mobile communication system, even a UE having already been registered in the 5G CN may be required to reestablish registration in the EPC as necessary (or vice versa, even a UE having already been registered in the EPC may be required to reestablish registration in the 5G CN as necessary). Accordingly, it is possible to provide a CN type or a slice type according to each radio access and each PLMN for a core network (CN) reestablishment function.

In operation h-20, if the UE receives the system information, the UE selects a PLMN, camps on the selected PLMN, and receives the remaining system information. The PLMN determination method may be determined based on a priority according to the first, second, or third embodiments of a PLMN selection method of the UE proposed in the above.

Thereafter, the UE may determine a CN value in the corresponding PLMN according to a CN priority recorded in the SIM or CN priority information for each PLMN. Alternatively, the priority information may be received through a NAS message and a value thereof may be managed, by the UE, as a black list. That is, the UE may determine the priority of the PLMN and the CN through previous access and reception of the NAS message, and may store the same. In addition, in the above operation, the UE may perform the selection of the PLMN and the CN at the same time. A condition for the selection may be implemented in various ways.

If data to be transmitted is generated by a UE, a connection of which is not currently established (hereinafter, referred to as an idle-mode UE), the UE performs an RRC connection establishment process with a base station. The UE establishes backward transmission synchronization with the base station through a random access procedure and transmits an RRCConnectionRequest message to the base station in operation h-15. The message includes a cause (establishmentCause) to establish a connection with an identifier of the UE. The base station transmits an RRCConnectionSetup message to allow the UE to establish the RRC connection in operation h-20. The message includes RRC connection configuration information and the like. The RRC connection is also referred to as a signaling radio bearer (SRB) and is used for transmitting or receiving an RRC message, which is a control message between the UE and the base station.

The UE, which has established the RRC connection, transmits an RRCConnetionSetupComplete message to the base station in operation h-20. The message includes a control message called a "SERVICE REQUEST" by which the UE makes a request for a bearer setup for a predetermined service to an MME. Further, in the disclosure, the SERVICE REQUEST control message may include an indicator indicating selected radio access or PLMN and CN type or slice type information.

The base station transmits a SERVICE REQUEST message h-30 or g-40 included in the RRCConnetionSetupComplete message to the currently connected MME (the present embodiment is based on an assumption that a connection to a 5G CN has been established. If a connection to the EPC has been established, the 5G CN may be replaced by the EPC in all the operations performed thereafter). The SERVICE REQUEST control message h-30 or g-40 may be selected according to the preferred CN type or a preferred slice type determined by the UE and transmitted to the corresponding CN (5G CN or EPC). The SERVICE REQUEST control message h-30 or h-40 includes a request requesting the MME to establish bearer setup for a predetermined service of the UE, and the MME determines whether to provide a service requested by the UE.

As a result of the determination, if it is determined to provide a service requested by the UE, the MME transmits an INITIAL CONTEXT SETUP REQUEST message h-35 or h-45 to the base station. The INITIAL CONTEXT SETUP REQUEST message includes information, such as quality of service (QoS) information to be applied to data radio bearer (DRB) setup and security-related information to be applied to the DRB (for example, a security key and a security algorithm)

The base station exchanges a SecurityModeCommand message h-50 and a SecurityModeComplete message h-55 with the UE in order to establish security.

If the security has been completed established, the base station transmits an RRCConnectionReconfiguration message to the UE in operation h-60. The message includes configuration information of a DRB for processing user data, and the UE configures the DRB by applying the information and transmits an RRCConnectionReconfigurationComplete message to the base station in operation h-65.

The base station, which has completed DRB setup with the UE, transmits an INITIAL CONTEXT SETUP COMPLETE message to the MME in operation h-70, and the MME, which has received the INITIAL CONTEXT SETUP COMPLETE message, exchanges an S1 BEARER SETUP message and an S1 BEARER SETUP RESPONSE message in order to establish S1 bearer with the S-GW. The S1 bearer is a connection for data transmission established between the S-GW and the base station and corresponds to the DRB in one-to-one basis in operation h-75 or h-80.

If the above process is completed, the UE transmits or receives data to or from the base station through the S-GW in operation h-85. The general data transmission process largely includes three operations, such as RRC connection setup, security setup, and DRB setup. In addition, for a particular reason, the current CN may make a request for a CN change to the UE. A condition needed for the CN change is that the currently connected CN may not support a particular service requested by the UE or to provide a better service.

For the above reason, the MME may transmit a UE CN RE-SELECTION control message h-90 to the UE, or transmit the UE CN RE-SELECTION control message to the base station in operation h-95, and then the base station may transmit a CN re-selection priority through an RRCConnectionReconfiguration message in operation h-100.

The UE, which has received the NAS control message or RRC control message, performs a procedure of reselecting the CN based on a CN reselection priority in operation h-105. That is, instead of the RRC messages of operations h-15 to h-25, a new RRC message or an RRCConnectionReconfigurationComplete message, which is a response message to the previously received RRCConnectionReconfiguration message, may include CN re-selection information and then may be transmitted to the base station in operation h-110.

Thereafter, a procedure for CN reselection may be performed, which includes all procedures of connection setup for the CN to be changed and transmitting or receiving data to or from the CN, and may be mapped to operations h-30 to h-85 in operation h-115.

Figure 9:
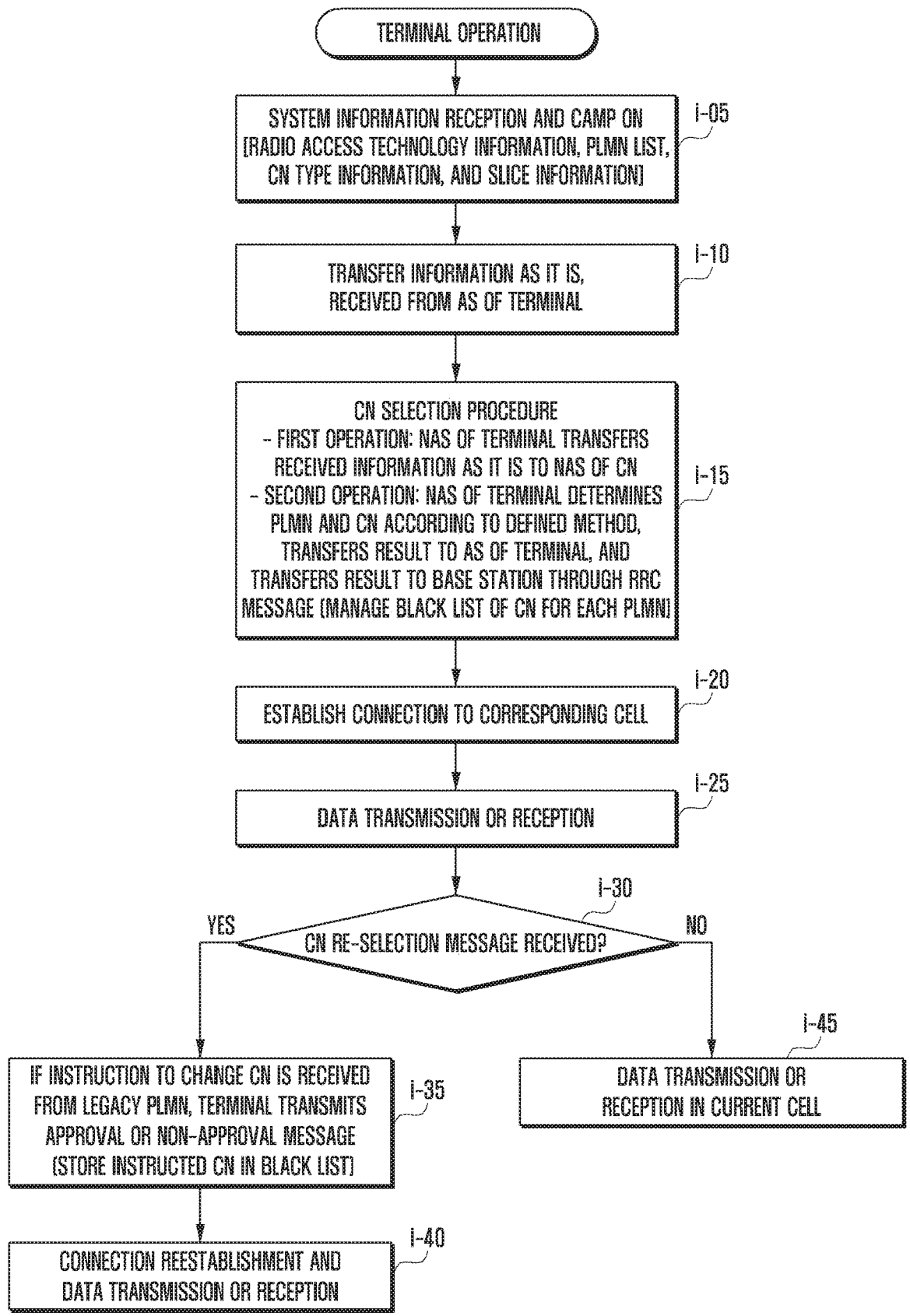
FIG. 9 illustrates a terminal operation in which a terminal selects a CN according to the disclosure.

FIG. 9 illustrates a UE operation in which a UE selects a CN according to the disclosure.

The UE, which is in an RRC idle state, receives system information, particularly SIB1, receives PLMN and CN information for determining a cell to camp on, and camps on a cell supporting an appropriate PLMN in operation i-05. The system information (e.g., SIB1) includes not only PLMN information, but also CN type information indicating whether to support the 5G CN and the EPC according to each radio access technology and each PLMN, or slice type information supported if a slice is supported. The AS of the UE transfers the information as it is, received as system information, to the NAS of the UE in operation i-10.

Thereafter, the NAS of the UE performs a procedure for selecting a CN. According to a preconfigured operation method, the procedure may be performed as a first operation and a second operation. In a case of the first operation, the NAS of the UE transfers the received radio access technology, PLMN, CN type, and slice type information as it is to the NAS of the CN. The CN may be a basic CN which is initially configured with a base station, and may be changed to another CN value according to performing reconfiguration. In this case, the initially configured CN is in charge of reselection of the CN, and the UE does not care about subsequent operations and performs data transmission or reception, through an RRC connection (i-20), to or from the base station in operation i-25.

In a case of the second operation, the NAS of the UE determines a radio access technology, PLMN, CN type, and slice type according to a predefined method, transfers a result of the determination to the AS of the UE, and then transfers the result of the determination to the base station through the RRC message in operation i-15. The method of determining the PLMN and CN may be a priority-based determination and may be determined according to a black list stored in the UE. The black list may be obtained through a NAS message received from CN and mapping information of PLMN and CN received through SIB 1.

Thereafter, the UE performs data transmission or reception, through the RRC connection (i-20), to or from the base station in operation i-25. In addition, all of the above CN selection procedures may be simultaneously performed with the procedure i-05 of selecting the PLMN.

In addition, the terminal may receive, from a currently connected CN, a CN RE-SELECTION control message indicating a request for CN reconfiguration of a UE or reject access for a current CN. Alternatively, the UE may receive an RRC message (RRCConnectionReconfiguration) including the information from the base station in operation i-30.

Upon receiving the message, since the message indicates an instruction to change the CN in the existing PLMN, the UE determines whether to approve or disapprove the instruction and then transmits the RRC message to the base station. Alternatively, the UE may transmit the message to the connected CN through a NAS message. Thereafter, the base station performs reconfiguration of the CN in consideration of the UE's response, performs an RRC reconfiguration process with the UE, and performs continuous data transmission or reception in operation i-40. If the terminal does not receive any message in operation i-30, continuous data transmission or reception is performed in the current serving cell in operation i-45.

Figure 10:
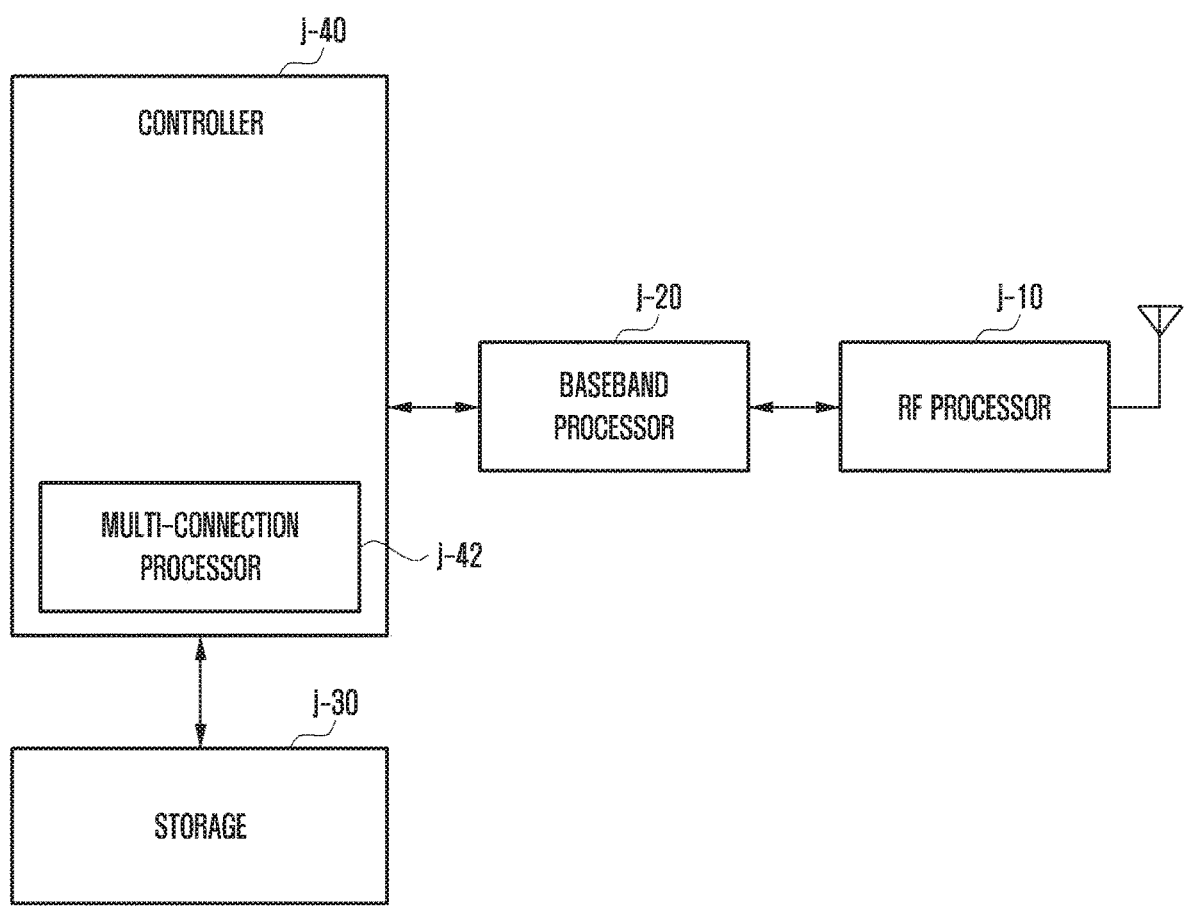
FIG. 10 is a block diagram showing the internal structure of a terminal to which the disclosure is applied.

FIG. 10 is a block diagram showing the internal structure of a UE to which the disclosure is applied.

Referring to FIG. 10, the UE includes a radio frequency (RF) processor j-10, a baseband processor j-20, a storage j-30, and a controller j-40.

The RF processor j-10 performs a function for transmitting or receiving a signal, such as band conversion and amplification of the signal, through a radio channel. That is, the RF processor j-10 up-converts a baseband signal provided from the baseband processor j-20 into an RF band signal and transmits the RF band signal through an antenna, and down-converts the RF band signal, received through the antenna, into a baseband signal. For example, the RF processor j-10 may include a transmission filter, a reception filter, an amplifier, a mixer, an oscillator, a digital to analog convertor (DAC), an analog to digital convertor (ADC), and the like. In FIG. 10, only one antenna is shown, but the terminal may include a plurality of antennas.

Further, the RF processor j-10 may include a plurality of RF chains. Furthermore, the RF processor j-10 may perform beamforming. For the beamforming, the RF processor j-10 may adjust the phase and magnitude of each of the signals transmitted or received through a plurality of antennas or antenna elements. In addition, the RF processor may perform a multiple input multiple output (MIMO) operation, and may receive multiple layers at the time of performing the MIMO operation.

The baseband processor j-20 performs a function of conversion between a baseband signal and a bit string according to the physical layer standard of a system. For example, upon transmitting data, the baseband processor j-20 generates complex symbols by encoding and modulating a transmission bit stream.

In addition, upon receiving data, the baseband processor j-20 reconstructs a reception bit string by demodulating and decoding the baseband signal provided from the RF processor j-10. For example, according to an orthogonal frequency division multiplexing (OFDM) scheme, upon transmitting data, the baseband processor j-20 generates complex symbols by encoding and modulating a transmission bit stream, maps the complex symbols onto sub-carriers, and then configures OFDM symbols by performing an inverse fast Fourier transform (IFFT) operation and insertion of a cyclic prefix (CP).

In addition, upon receiving data, the baseband processor j-20 divides the baseband signal provided from the RF processor j-10 in OFDM symbol units, reconstructs the signals, which has been mapped onto the sub-carriers, through a fast Fourier transform (FFT) operation, and then reconstructs the reception bit string by demodulating and decoding the mapped signals.

The baseband processor j-20 and the RF processor j-10 transmit or receive a signal as described above. Accordingly, the baseband processor j-20 and the RF processor j-10 may be referred to as a transmitter, a receiver, a transceiver, or a communication unit. Furthermore, at least one of the baseband processor j-20 and the RF processor j-10 may include a plurality of communication modules to support different radio access technologies. In addition, at least one of the baseband processor j-20 and the RF processor j-10 may include different communication modules to process signals of different frequency bands. For example, the different radio access technologies may include a wireless LAN (e.g., IEEE 802.11), a cellular network (e.g., LTE), and the like. In addition, the different frequency bands may include a super high frequency (SHF) (e.g., 2.NRHz, NRHz) band, and a millimeter wave (e.g., 60 GHz) band.

The storage j-30 stores data, such as a basic program, an application program, and configuration information for performing the UE operation. In particular, the storage j-30 stores information related to a second access node for performing wireless communication using a second radio access technology. The storage j-30 provides stored data at the request of the controller j-40.

The controller j-40 controls overall operations of the terminal. For example, the controller j-40 transmits or receives a signal through the baseband processor j-20 and the RF processor j-10. In addition, the controller j-40 records or reads data in or from the storage j-40. To this end, the controller j-40 may include at least one processor. For example, the controller j-40 may include a communication processor (CP) for performing control for communication and an application processor (AP) for controlling a higher layer such as an application program.

Figure 11:
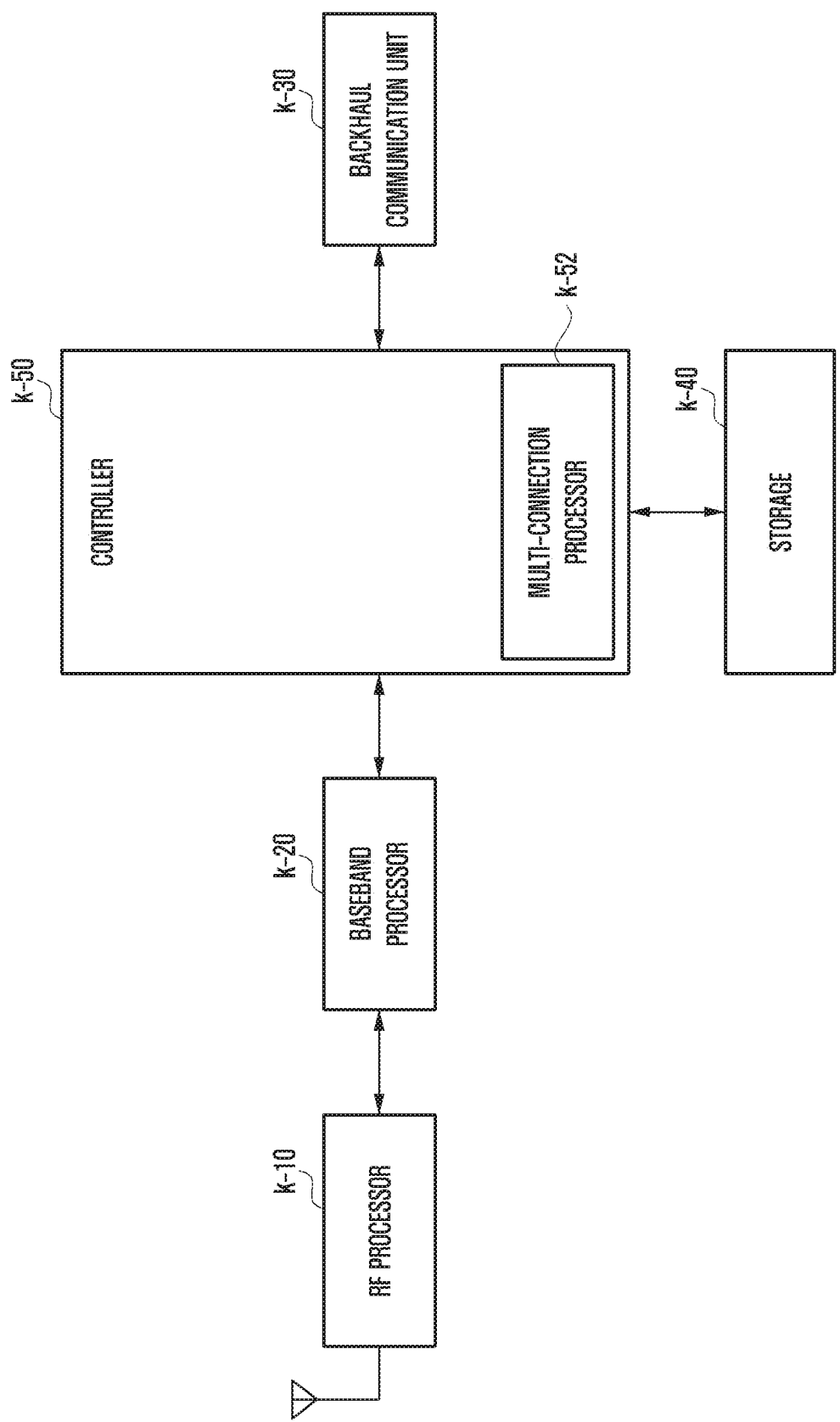
FIG. 11 is a block diagram showing the configuration of a base station according to the disclosure.

FIG. 11 is a block diagram showing the configuration of a base station according to the disclosure.

As shown in FIG. 11, the base station includes an RF processor k-10, a baseband processor k-20, a backhaul communication unit k-30, a storage k-40, and a controller k-50.

The RF processor k-10 performs a function for transmitting or receiving a signal, such as band conversion and amplification of the signal, through a radio channel That is, the RF processor k-10 up-converts a baseband signal provided from the baseband processor k-20 into an RF band signal and transmits the RF band signal through an antenna, and down-converts the RF band signal, received through the antenna, into a baseband signal. For example, the RF processor k-10 may include a transmission filter, a reception filter, an amplifier, a mixer, an oscillator, a digital to analog convertor (DAC), an analog to digital convertor (ADC), and the like. In FIG. 11, only one antenna is shown, but a first access node may include a plurality of antennas.

Further, the RF processor k-10 may include a plurality of RF chains. Furthermore, the RF processor k-10 may perform beamforming. For the beamforming, the RF processor k-10 may adjust the phase and magnitude of each of the signals transmitted or received through a plurality of antennas or antenna elements. In addition, the RF processor may perform a MIMO operation by transmitting one or more layers.

The baseband processor k-20 performs a function of conversion between a baseband signal and a bit string according to the physical layer standard of a first radio access technology. For example, upon transmitting data, the baseband processor k-20 generates complex symbols by encoding and modulating a transmission bit stream. In addition, upon receiving data, the baseband processor k-20 reconstructs a reception bit string by_demodulating and decoding the baseband signal provided from the RF processor k-10. For example, according to an orthogonal frequency division multiplexing (OFDM) scheme, upon transmitting data, the baseband processor k-20 generates complex symbols by encoding and modulating a transmission bit stream, maps the complex symbols onto sub-carriers, and then configures OFDM symbols by performing an IFFT operation and CP insertion.

In addition, upon receiving data, the baseband processor k-20 divides the baseband signal provided from the RF processor k-10 in OFDM symbol units, reconstructs the signals, which has been mapped onto the sub-carriers, through a FFT operation, and then reconstructs the reception bit string by demodulating and decoding the mapped signals. The baseband processor k-20 and the RF processor k-10 transmit or receive a signal as described above. Accordingly, the baseband processor k-20 and the RF processor k-10 may be referred to as a transmitter, a receiver, a transceiver, a communication unit, or wireless communication unit.

The backhaul communication unit k-30 provides an interface for communication with other nodes in a network. That is, the backhaul communication unit k-30 converts a bit string, transmitted from a main base station to another node, for example, an auxiliary base station, a core network, etc., into a physical signal, and converts the physical signal, received from the another node, into a bit string.

The storage k-40 stores data, such as a basic program, an application program, and configuration information for performing the operation of a main base station. In particular, the storage k-40 may store information on a bearer allocated to the connected UE, a measurement result reported from the connected UE, and the like. In addition, the storage k-40 may store information serving as a criterion for determining whether to provide or terminate multiple connections to the terminal. In addition, the storage k-40 provides stored data at the request of the controller k-50.

The controller k-50 controls overall operations of the main base station. For example, the controller k-50 transmits or receives a signal through the baseband processor k-20 and the RF processor k-10, or through the backhaul communication unit k-30. In addition, the controller k-50 records or reads data in or from the storage k-40. To this end, the controller k-50 may include at least one processor.

The embodiments according to the disclosure described and shown in the specification and the drawings have been presented to easily explain the technical contents according to the disclosure and help understanding according to the disclosure, and are not intended to limit the scope according to the disclosure. That is, it will be apparent to those skilled in the art that other modifications and changes may be made thereto on the basis of the technical spirit according to the disclosure. Further, the above respective embodiments may be employed in combination, as necessary. For example, the method proposed in the disclosure may be partially combined to operate a base station and a terminal. Further, although the above embodiments have been described by way of the LTE/LTE-A system, other variants based on the technical idea of the embodiments may be implemented in other systems such as 5G and NR systems.

The invention claimed is:

1. A method performed by a terminal in a wireless communication system, the method comprising:
   receiving, from a base station, system information including information on a public land mobile network (PLMN) list and information on a slice type for a type of a core network, the PLMN list including at least one PLMN for the type of the core network, wherein the type of the core network includes an evolved packet core (EPC) and a fifth generation core (5GC);
   selecting, by a non-access stratum (NAS) layer of the terminal, a core network type corresponding to a preferred slice type preferred by the terminal, based on the system information;
   transmitting, to the base station, a radio resource control (RRC) connection request message for the selected core network type;
   receiving, from the base station, an RRC connection setup message, in response to the RRC connection request message;
   transmitting, to the base station, an RRC connection setup complete message based on the RRC connection setup message, wherein the RRC connection setup complete message includes network slice information associated with the preferred slice type, in case that the selected core network type is the 5GC; and
   receiving, from the base station, an RRC message including information for re-directing the terminal to another core network type.

2. The terminal method of claim 1,
   wherein the system information is received by an access stratum (AS) layer of the terminal, and
   wherein, if the system information is received, the AS layer provides the NAS layer with the PLMN list.

3. The terminal method of claim 1, wherein the RRC connection request message includes an identity of the terminal and information on an establishment cause.

4. A method performed by a base station in a wireless communication system, the method comprising:
   transmitting, to a terminal, system information including information on a public land mobile network (PLMN) list and information on a slice type for a type of a core network, the PLMN list including at least one PLMN for the type of the core network, wherein the type of the core network includes an evolved packet core (EPC) and a fifth generation core (5GC);
   receiving, from the terminal, a radio resource control (RRC) connection request message for a core network type, the core network type being selected by a non-access stratum (NAS) layer of the terminal based on the system information;
   transmitting, to the terminal, an RRC connection setup message, in response to the RRC connection request message;
   receiving, from the terminal, an RRC connection setup complete message based on the RRC connection setup message, wherein the RRC connection setup complete message includes network slice information associated with a preferred slice type preferred by the terminal used for selecting the core network type, in case that the selected core network type is the 5GC; and
   transmitting, to the terminal, an RRC message including information for re-directing the terminal to another core network type.

5. The base station method of claim 4,
   wherein the system information is received by an access stratum (AS) layer of the terminal, and
   wherein, if the system information is received, the AS layer provides the NAS layer with the PLMN list.

6. The base station method of claim 4, wherein the RRC connection request message includes information on an identify of the terminal and information on an establishment cause.

7. A terminal in a wireless communication system, the terminal comprising:
   a transceiver; and
   a controller configured to:
   control the transceiver to receive, from a base station, system information including information on a public land mobile network (PLMN) list and information on a slice type for a type of a core network, the PLMN list including at least one PLMN for the type of the core network, wherein the type of the core network includes an evolved packet core (EPC) and a fifth generation core (5GC),
   select a core network type corresponding to a preferred slice type preferred by the terminal, based on the system information, by a non-access stratum (NAS) layer of the terminal,
   control the transceiver to transmit a radio resource control (RRC) connection request message for the selected core network type,
   control the transceiver to receive, from the base station, an RRC connection setup message, in response to the RRC connection request message,
   control the transceiver to transmit, to the base station, an RRC connection setup complete message based on the RRC connection setup message, wherein the RRC connection setup complete message includes network slice information associated with the preferred slice type, in case that the selected core network type is the 5GC, and
   control the transceiver to receive, from the base station, an RRC message including information for re-directing the terminal to another core network type.

8. The terminal of claim 7,
   wherein the system information is received by an access stratum (AS) layer of the terminal, and
   wherein, if the system information is received, the controller is configured to control to provide, from the AS layer to the NAS layer, the PLMN list.

9. The terminal of claim 7, wherein the RRC connection request message includes an identity of the terminal and information on an establishment cause.

10. A base station in a wireless communication system, the base station comprising:
    a transceiver; and
    a controller configured to:
    control the transceiver to transmit, to a terminal, system information including information on a public land mobile network (PLMN) list and information on a slice type for a type of a core network, the PLMN list including at least one PLMN for the type of the core network, wherein the type of the core network includes an evolved packet core (EPC) and a fifth generation core (5GC),
    control the transceiver to receive, from the terminal, a radio resource control (RRC) connection request message for a core network type, the core network type being selected by a non-access stratum (NAS) layer of the terminal based on the system information,
    control the transceiver to transmit, to the terminal, an RRC connection setup message, in response to the RRC connection request message, and control the transceiver to receive, from the terminal, an RRC connection setup complete message based on the RRC connection setup message, wherein the RRC connection setup complete message includes network slice information associated with a preferred slice type preferred by the terminal used for selecting the core network type, in case that the selected core network type is the 5GC, and control the transceiver to transmit, to the terminal, an RRC message including information for re-directing the terminal to another core network type.

11. The base station of claim 10, wherein the system information is received by an access stratum (AS) layer of the terminal, and wherein, if the system information is received, the AS layer provides the NAS layer with the PLMN list.

12. The base station of claim 10, wherein the RRC connection request message includes information on an identify of the terminal and information on an establishment cause.

\* \* \* \* \*